C. W. ISBELL.
Gas-Meter.

No. 203,276. Patented May 7, 1878.

UNITED STATES PATENT OFFICE.

CHARLES W. ISBELL, OF NEW YORK, N. Y.

IMPROVEMENT IN GAS-METERS.

Specification forming part of Letters Patent No. 203,276, dated May 7, 1878; application filed July 10, 1877.

*To all whom it may concern:*

Be it known that I, CHARLES W. ISBELL, of the city and State of New York, have invented an Improvement in Gas-Meters; and I do hereby declare that the following is a full, clear, and exact description of the same, reference being had to the accompanying drawings, forming part of this specification.

My invention relates to that class of gas-meters technically and commonly known as "dry meters."

The invention has for its object the supply of a more durable and efficient packing for the spindles which transmit motion from the bellows of the meter to the crank of the registering-train and to the valves, and which allows the said spindles to run with less friction and with uniform friction.

The invention consists, partly, in the combination, with the aforesaid spindles, of annular cups for holding mercury, two of which are attached to the plate which separates the bellows-chamber from the register-chamber, and the other of which is attached to the plate which separates the register-chamber from the valve-chamber, and dips or inverted cups attached to said spindles and playing in the annular cups, in such manner that when mercury is supplied to the annular cups, the mercury prevents the passage of gas through said annular cups and dips.

The invention also consists in the combination, with the meter-case and the annular cups, of means for supplying said cups with mercury from the outside of the meter.

Figure 1:
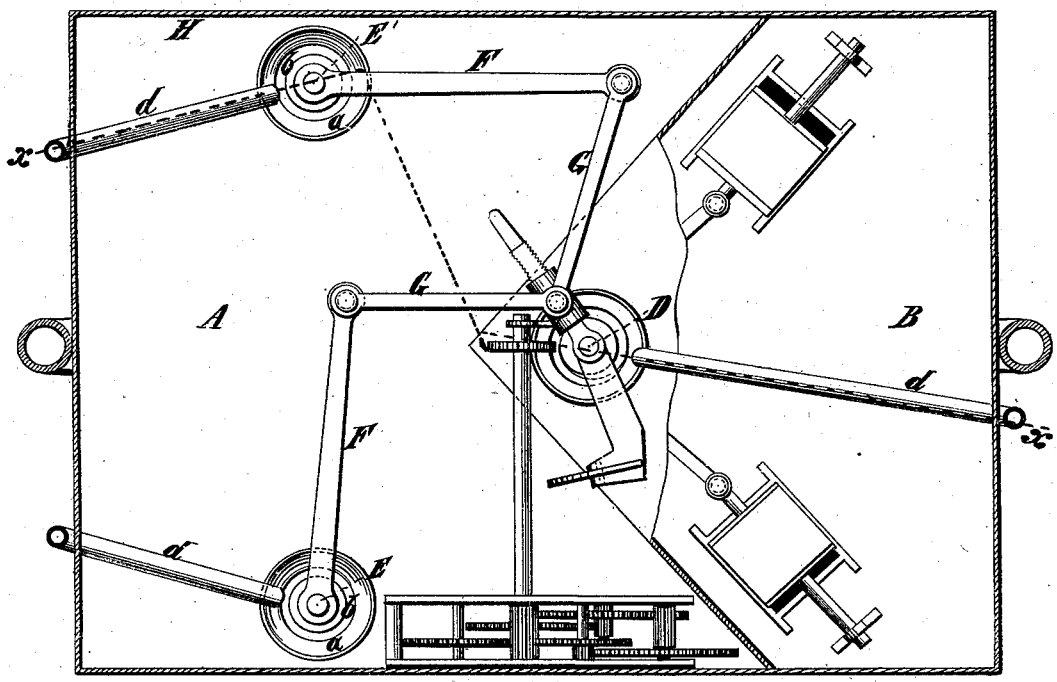
Figure 2:
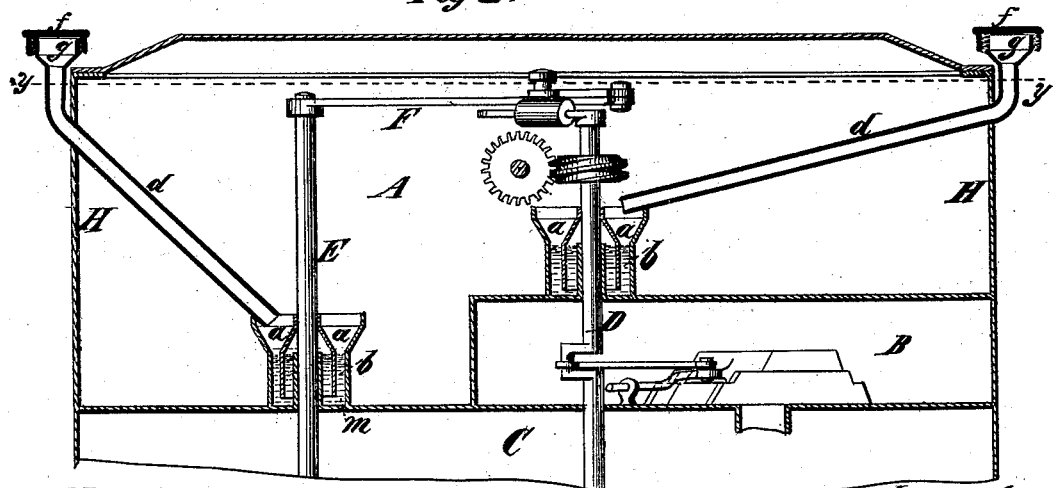

Figure 1 in the drawing is a top view of a gas-meter which has the top of the case removed and a portion of the top of the valve-case broken away, and also a section on the line $y\, y$ in Fig. 2. Fig. 2 is a vertical section on the line $x\, x$ in Fig. 1.

A is the register-chamber, B the valve-chamber, and C the bellows-chamber. D is the crank-spindle, which actuates the valves, and which passes through the partition which separates the valve-chamber B from the register-chamber. E and E' are the rock-spindles, which, through the oscillating arms F and links G, rotate the crank-spindle D, said spindles E and E' passing through the partition which separates the bellows-chamber C from the register-chamber A.

Heretofore stuffing-boxes have been used to pack the passages for the said spindles through the said partitions, and in practice these stuffing-boxes are generally the first parts of the meter which give out. To repair them it is necessary to unsolder and remove the top of the meter-case. Moreover, these stuffing-boxes generate an amount of friction which diminishes constantly until they begin to leak. As gas is elastic, it follows that the harder the meter runs the greater volume of gas at any fixed pressure will be delivered through it, and vice versa. Hence, when a new meter having such stuffing-boxes is tested and adjusted to the required accuracy, tendency of wear in the stuffing-boxes, which permits the meter to run easier, will be to register against the consumer.

My improvement in the packing of the spindles obviates the necessity of removing the top of the meter-case for repairing stuffing-boxes, and renders the friction uniform from first to last. The packing never wears out, and there can never be any leakage around the spindles.

To pack the said spindles I form on or attach to the partitions which separate the bellows-chamber and the valve-chamber from the register-chamber annular cups $a$. I form on or attach to each of the spindles E, E', and D a dip or inverted cup, $b$, said dips being formed on or attached gas-tight to said spindles, in such relation with the annular cups $a$ that the lower parts of said dips penetrate into the interior of the said annular cups.

In the said annular cups mercury $m$, Fig. 2, is placed, such a depth of the mercury in the said cups being employed that the weight of the mercury-column will resist the pressure of the gas, and prevent its escape through said cups. This amount of mercury is predetermined, and is not placed in the cups till the meter is placed and connected with the service-pipes for use, the introduction of the mercury being performed through appliances, and in the manner hereinafter described.

To prevent the overflow of the mercury from the annular cups $a$, I make the upper portions of said cups flaring, or contract the tops of the dips inwardly, or I both enlarge the tops of the annular cups and contract the tops of the dips inwardly, as shown more plainly in Fig. 2.

The appliances for supplying the said annular cups $a$ with mercury consist of tubes $d$, leading from and through the outside of the meter-case H to the interior of said cups, said tubes, or portions of the same, being inclined to permit the easy flow of the mercury through said tubes. Said tubes are fitted gas-tight through the meter-case, and the outer ends of the tubes are supplied with gas-tight caps $f$, Fig. 2, or any other suitable stoppers, preferably screw-caps. The upper ends of said tubes may also be made with small funnels $g$, to facilitate the introduction of the predetermined quantity of mercury calculated for each size of meter.

In use, the meter is first connected with the service-pipes. The caps $f$ are then removed, and the requisite quantity of mercury is poured into each of the tubes $d$. The caps or stoppers $f$ are then replaced on the tops of said tubes, and the meter is then ready for use.

I claim—

1. The combination, with the spindles of a dry gas-meter, of a dip attached to said spindles, and revolving with them, and an annular cup attached to the partition-plate, through which said spindles pass, the dip being arranged to play in the cup, which is filled with mercury, substantially as and for the purposes set forth.

2. The combination, with the meter-case and the annular mercury-cups, of the tubes $d$, passing through said meter-case, and provided with stoppers outside of the case, substantially as and for the purpose specified.

CHAS. W. ISBELL.

Witnesses:
BENJAMIN W. HOFFMAN,
FRED. HAYNES.